US008832554B2

(12) United States Patent
Shoemaker

(10) Patent No.: US 8,832,554 B2
(45) Date of Patent: Sep. 9, 2014

(54) MORPHING BETWEEN VIEWS OF DATA

(75) Inventor: Austin W. Shoemaker, Sarasota, FL (US)

(73) Assignee: Apple Inc., Cupertino, CA (US)

( * ) Notice: Subject to any disclaimer, the term of this patent is extended or adjusted under 35 U.S.C. 154(b) by 661 days.

(21) Appl. No.: 12/862,475

(22) Filed: Aug. 24, 2010

(65) Prior Publication Data

US 2010/0318915 A1 Dec. 16, 2010

Related U.S. Application Data

(62) Division of application No. 10/444,464, filed on May 22, 2003, now Pat. No. 7,788,605.

(51) Int. Cl.
*G06F 3/00* (2006.01)
(52) U.S. Cl.
USPC ............................ 715/723; 715/726; 715/732
(58) Field of Classification Search
USPC ......... 715/706, 709, 730, 732, 768, 838, 861, 715/719–726, 769–770, 841; 345/588, 641, 345/649; 386/278–290
See application file for complete search history.

(56) References Cited

U.S. PATENT DOCUMENTS

| | | | |
|---|---|---|---|
| 5,442,744 A | 8/1995 | Piech et al. | |
| 5,513,306 A | 4/1996 | Mills et al. | |
| 6,208,360 B1 | 3/2001 | Doi et al. | |
| 6,366,282 B1 | 4/2002 | Trika | |
| 6,750,919 B1 | 6/2004 | Rosser | |
| 6,924,821 B2 * | 8/2005 | Trinh et al. | 345/629 |
| 6,973,130 B1 * | 12/2005 | Wee et al. | 375/240.16 |
| 7,082,572 B2 | 7/2006 | Pea et al. | |
| 7,770,117 B1 | 8/2010 | Uy et al. | |
| 2002/0167541 A1 * | 11/2002 | Ando et al. | 345/723 |
| 2003/0021344 A1 * | 1/2003 | Panusopone et al. | 375/240.16 |
| 2003/0035649 A1 * | 2/2003 | Chung et al. | 386/111 |

\* cited by examiner

*Primary Examiner* — Weilun Lo
*Assistant Examiner* — Truc Chuong
(74) *Attorney, Agent, or Firm* — Schwegman Lundberg & Woessner, P.A.

(57) ABSTRACT

A method, apparatus, system, and signal-bearing medium are provided that in an embodiment morph between two graphical views of related content that share a common frame of reference. In an embodiment, the two views depict the same data at different resolutions. The morphing permits the viewer to visualize the relationship between the two views along a common axis or within a common frame of reference. In another embodiment, the two views may be a clip view and an timeline view. In the clip view, icons representing clips are the same size. In the timeline view, icons representing clips have a size proportional to the time of the clip when played. A virtual playhead icon is maintained in the same relative position in both views, so that a user's focus is maintained.

21 Claims, 7 Drawing Sheets

MORPHING BETWEEN VIEWS OF DATA

CLAIM OF PRIORITY

This application is a divisional of and claims the benefit of priority under 35 U.S.C. 120 to U.S. patent application Ser. No. 10/444,464, filed on May 22, 2003, now U.S. Pat. No. 7,788,605, which is hereby incorporated by reference herein in its entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to graphical user interfaces for an interactive device.

BACKGROUND

Years ago, filmmakers shot vast quantities of film footage and then edited it into final form by physical cutting and splicing clips (sequences of frames) together in a labor-intensive, time-consuming, and expensive process. Today, however, computers have dramatically changed the process of film editing because nonlinear editing (NLE) applications represent the clips in digital form and allow the clips to be virtually cut and spliced together. These applications are called nonlinear because no physical tape or film is involved in the editing process, so the user may jump immediately to the desired clip without physically rewinding or fast-forwarding tape or film.

Nonlinear editing applications often represent clips via a clip view, a timeline view, or both a clip view and a timeline view. The clip view represents each clip with a an icon called a slide, which contains the first frame of the clip, and all the slides have the same size. The clip view is generally used to re-arrange the order of the clips, to delete clips, and to insert clips. In contrast, the timeline view represents each clip with an icon called a band, which contains the first frame of each respective clip, and the bands have sizes proportional to the time of the clip when played. The timeline view is generally used to lay down audio, to synchronize the audio with the video, and to work with the clips based on their length.

A problem occurs when switching between the clip view and the timeline view in that the switch is visually jarring and disorienting, and the users lose their place within the clips. Although this problem has been described in the context of a clip view and a timeline view, the problem also occurs when switching between views of any type of data.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, and techniques have not been shown in detail in order not to obscure the invention.

Methods, apparatus, systems, and signal-bearing media are provided that in an embodiment morph between two graphical views of related content that share a common frame of reference. In an embodiment, the two views depict the same data at different resolutions. The morphing permits the viewer to visualize the relationship between the two views along a common axis or within a common frame of reference.

In another embodiment, a method, apparatus, system, and signal-bearing medium are provided that morph between a clip view and a timeline view. In the clip view, icons representing clips are the same size. In the timeline view, icons representing clips have a size proportional to the time of the clip when played. A virtual playhead icon may be maintained in the same relative position in both views, so that a user's focus is maintained.

Figure 1:
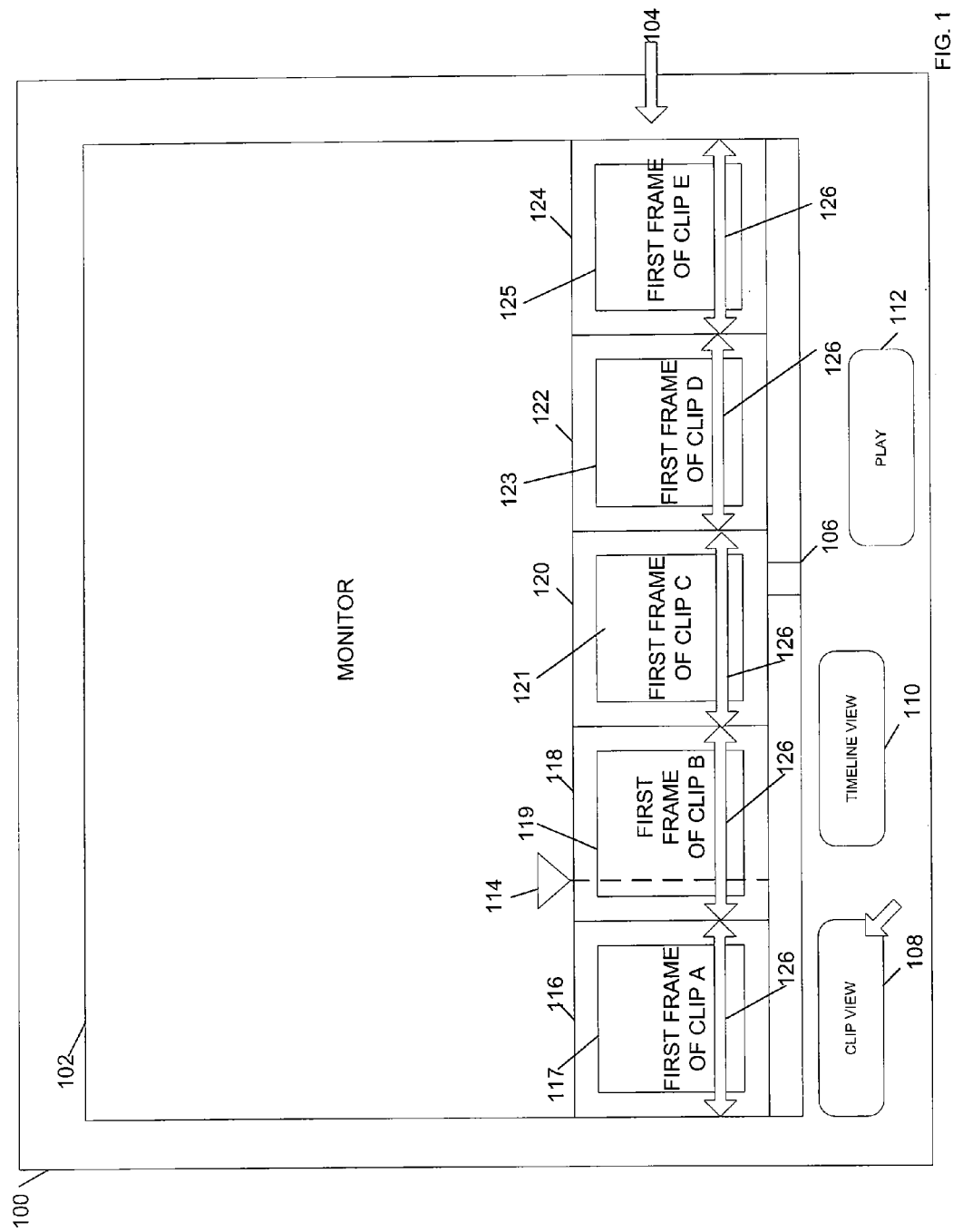
FIG. 1 depicts a pictorial representation of an example user interface illustrating a clip view, according to an embodiment of the invention.

FIG. 1 depicts a pictorial representation of an example user interface illustrating a clip view, according to an embodiment of the invention. A window 100 includes a monitor 102, a track 104, a scrollbar 106, buttons 108, 110, and 112, and a playhead icon 114.

The monitor 102 is a subwindow in which a selected clip or all clips may be played as further described below. A clip is a sequence of digitized frames, which may be displayed in succession to form video and/or audio. Digitized frames are analogous to physical frames that exist on conventional film or tape.

The track 104 contains slides 116, 118, 120, 122, and 124, which are icons that represent respective clips. All of the slides 116, 118, 120, 122, and 124 have the same size 126. Although the example of FIG. 1 illustrates five slides 116, 118, 120, 122, and 124, in other embodiments any number of slides may be present. The slides 116, 118, 120, 122, and 124 contain respective clip-icons 117, 119, 121, 123, and 125, which are icons that in an embodiment display the first frame of their respective clips. In another embodiment, some or all of the clip-icons may display any frame or a series of frames. In still another embodiment, any identifying information may be displayed within the clip-icons 117, 119, 121, 123, and 125.

The scrollbar 106 allows the user to request scrolling of the track 104 and also provides an indication of the location of the current view within the track 104. In the example shown, the scrollbar 106 is at a location approximately in the middle of the track 104, so an equal number of slides not in view (not currently visible) exist on both sides of the slides 116, 118, 120, 122, and 124. Although FIG. 1 illustrates a scrollbar, in other embodiments buttons or any other user interface element that provides access to a scrolling function may be used.

Since the window 100 shows the clip view, the clip-view button 108 is currently selected. When the user selects the timeline-view button 110, the contents of the clip view in the user interface 100 are morphed into the timeline view shown in FIG. 2 as further described below with reference to FIGS. 3 and 4.

The playhead icon 114 marks a location in one of the icons (in this example, the playhead icon 114 is shown marking a location within the slide 118) that represents a position of a virtual playhead within a corresponding one of the clips (in this example clip B). The playhead is described as "virtual" because there is no physical playhead since physical tape or film is not used in the editing process. When a play button 112 is selected, the corresponding clip (in this example clip B) begins playing in the monitor 102 at the virtual playhead position. In the example shown, the playhead icon 114 is displayed at a location that is approximately 20% of the way (when viewed from left to right) into the slide 118, so when the play button 112 is selected, the clip B begins playing in the monitor 102 approximately 20% of the way through the clip, which is the virtual playhead position in this example.

Figure 2:
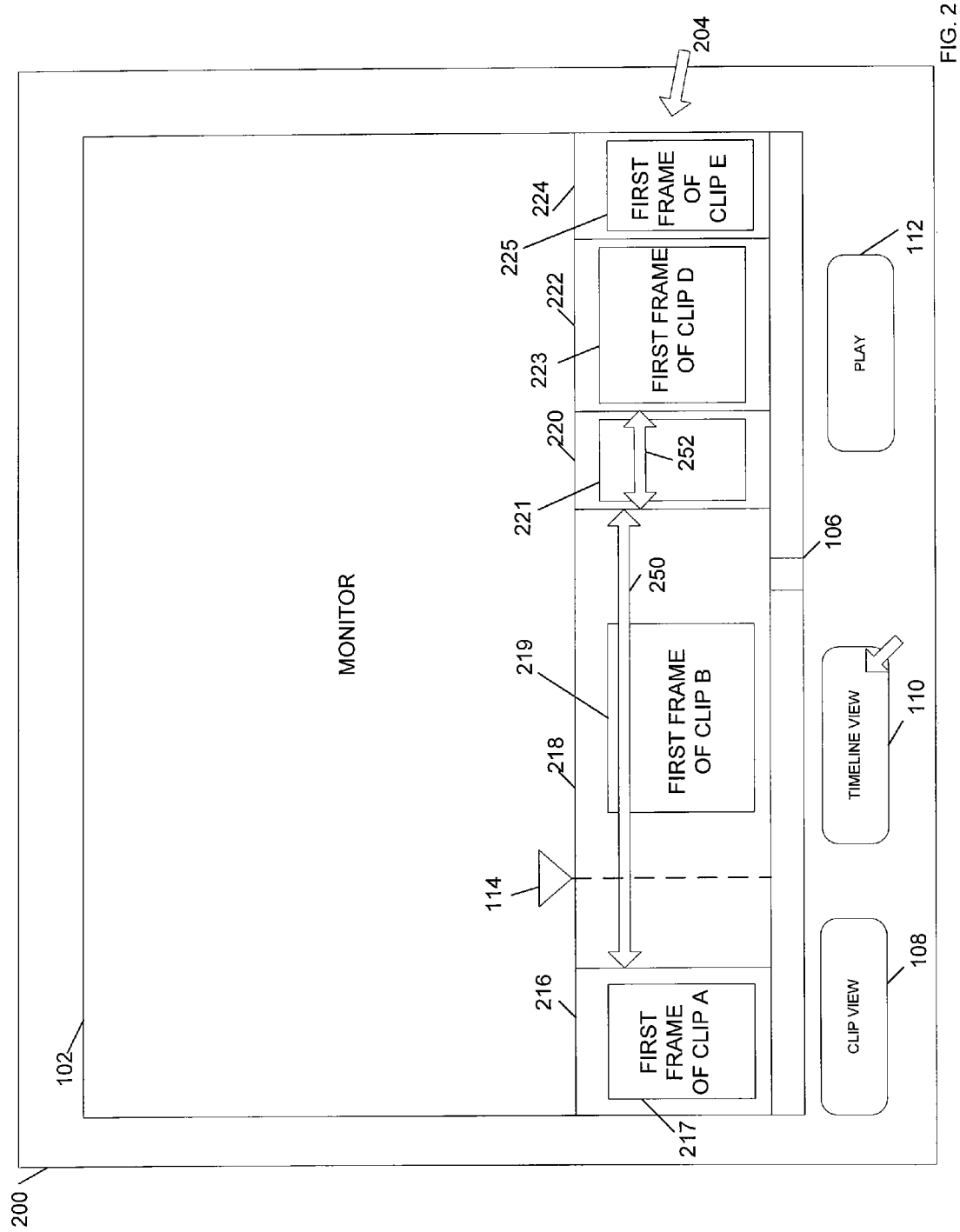
FIG. 2 depicts a pictorial representation of an example user interface illustrating a timeline view, according to an embodiment of the invention.

FIG. 2 depicts a pictorial representation of an example user interface illustrating a timeline view, according to an embodiment of the invention. A window 200 includes the monitor 102, a track 204, the scrollbar 106, the buttons 108, 110, and 112, and the playhead icon 114.

The track 204 contains bands 216, 218, 220, 222, and 224, which are icons that represent respective clips. The bands 216, 218, 220, 222, and 224 contain respective clip-icons 217, 219, 221, 223, and 225, which are icons that in an embodiment display the first frame of their respective clips. The bands 216, 218, 220, 222, and 224 have sizes that are proportional to the playing time of their respective clips. For example, clip B has the longest playing time, so the band 218 associated with clip B has the largest size 250. Likewise, clip C has the shortest playing time, so band 220 associated with clip C has the shortest size 252. The band 216 is a morphed version of the slide 116; the band 218 is a morphed version of the slide 118; the band 220 is a morphed version of the slide 120; the band 222 is a morphed version of the slide 122; and the band 224 of a morphed version of the slide 124.

Since the window 200 shows the timeline view, the timeline view button 110 is selected. When the user selects the clip-view button 108, the contents of the timeline view in the user interface 200 are morphed into the clip view shown in FIG. 1, as further described below with reference to FIGS. 3 and 4.

The playhead icon 114 is maintained during the morphing at the same relative location as it was in the clip view of FIG. 1. Thus, in the example shown in FIG. 2, the playhead icon 114 is still approximately 20% of the way (when viewed from left to right) into the band 218 even though the band 218 is larger than the corresponding slide 118.

Figure 3:
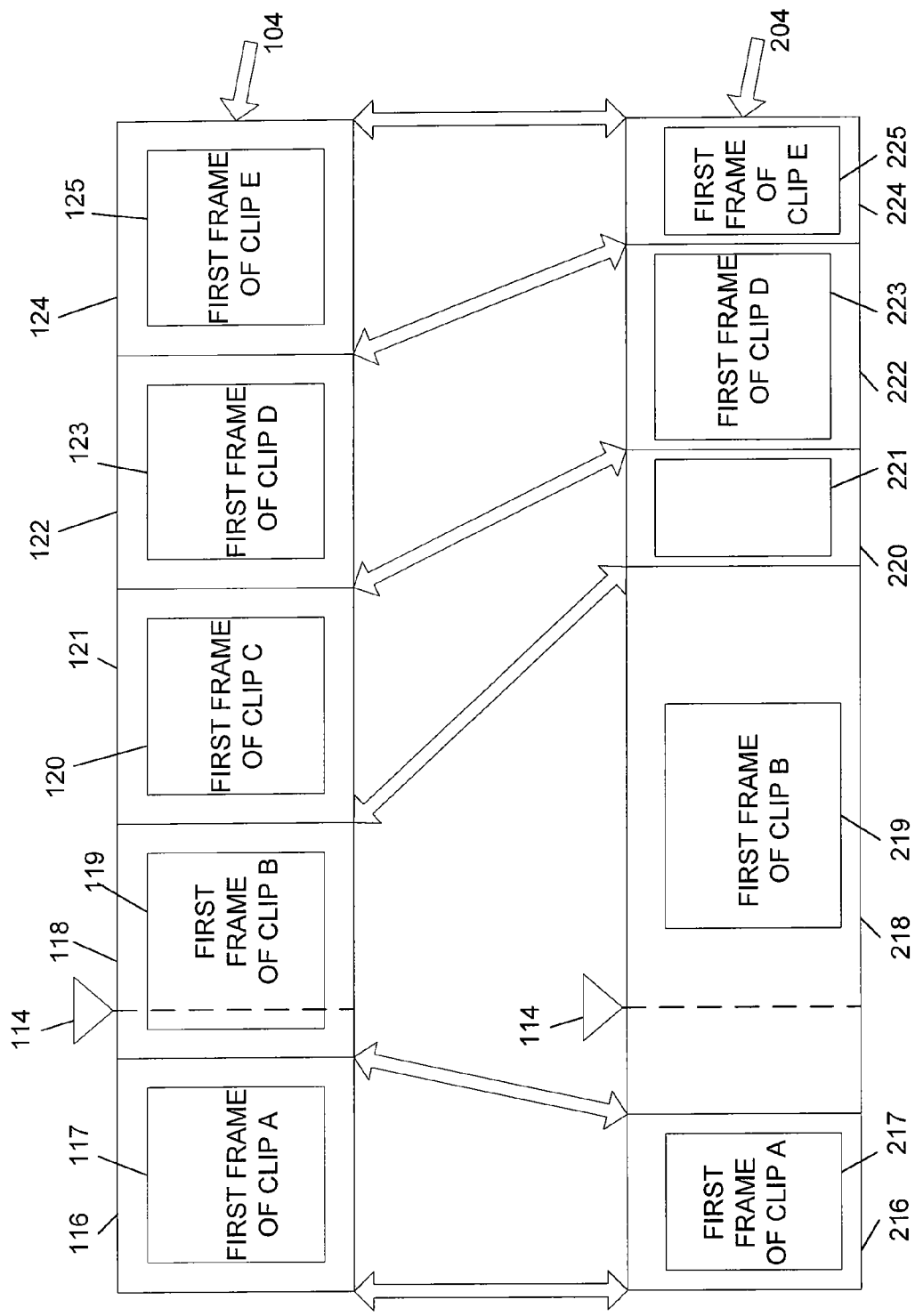
FIG. 3 depicts a block diagram of a morphing process, according to an embodiment of the invention.

FIG. 3 depicts a block diagram of a morphing process, according to an embodiment of the invention. Morphing is a term adopted from "metamorphosis" that refers to a process for incrementally transforming a first image into a second image over time using a sequence of intermediate images, so that the transformation appears to be relatively smooth and continuous. The morphing process morphs from the clip view of the track 104 to the timeline view of track 204 when the user selects the button 110 (FIG. 1) or from the timeline view of track 204 to the clip view of the track 104 when the user selects the button 108 (FIG. 2).

Morphing occurs between the slide 116 and the band 216, between the slide 118 and the band 218, between the slide 120 and the band 220, between the slide 122 and the band 222, and between the slide 124 and the band 224 as illustrated in FIG. 3. During the morphing process, the playhead icon 114 is maintained in the same relative position within its slide or band, which allows users to maintain focus. In the example shown in FIG. 3, the playhead icon 114 is approximately 20% of the way through the slide 118 and 20% of the way through the band 218 and is maintained at approximately 20% during the morphing process even though the band 218 has a larger size than the slide 118. Although in the example shown all of the icons remain visible during the morphing process, in other embodiments as the icons expand and/or contract some of the icons may be pushed out of view, so they may be accessed via the scrollbar 106 (FIGS. 1 and 2).

Figure 4:
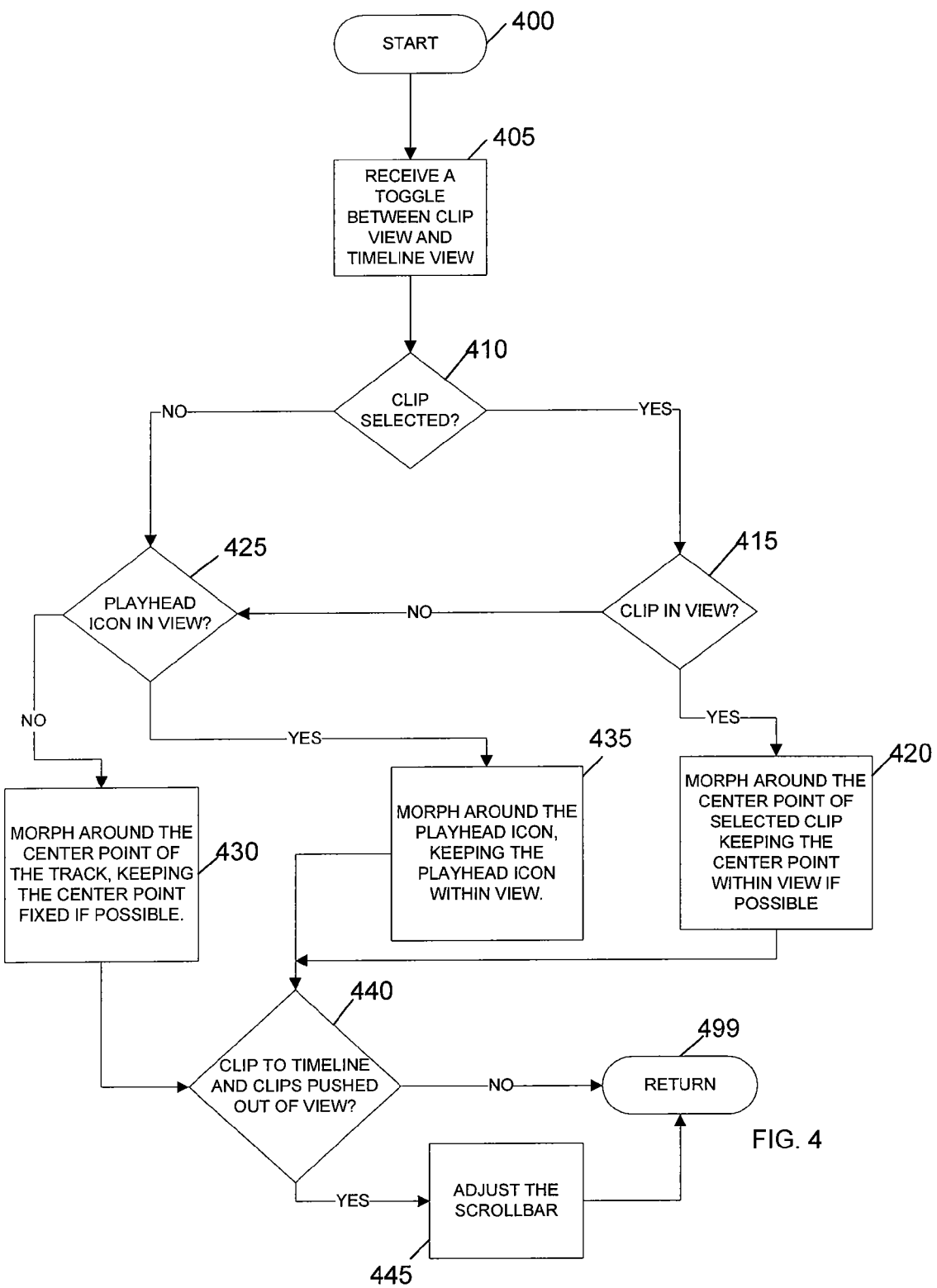
FIG. 4 depicts a flowchart of example processing, according to an embodiment of the invention.

FIG. 4 depicts a flowchart of an example morphing process, according to an embodiment of the invention. Control begins at block 400. Control then continues to block 405 where a toggle command between the clip view and the timeline view is received. In an embodiment, the user may toggle between the clip view and the timeline view by selecting either the clip view button 108 or the timeline view button 110, as previously described above with respect to FIGS. 1 and 2. Control then continues to block 410 where a determination is made whether a clip is selected. In various embodiments, a clip may be selected by selecting its associated clip-icon, slide, or band using an input device. But in other embodiments, any appropriate technique by be used for selecting a clip.

If the determination at block 410 is true, then control continues to block 415 where a determination is made whether the selected clip is in view, i.e., visible in the track 104 or 204, as previously described above with reference to FIGS. 1 and 2. If the determination at block 415 is true, then control continues to block 420 where a morphing operation is performed around the center point of the icon associated with the selected clip keeping the center point in view if possible. In an embodiment, the morphing process is a sequence of moving or transposing a point or points or a rectangle of four points over a period of time. The morphing process morphs between the clip view and the timeline view (in either direction depending on which command was received at block 405), as previously described above with reference to the examples of FIGS. 1, 2, and 3. In an embodiment, the morphing may be performed by a dynamic animation system, as further described below with reference to FIGS. 5, 6, 7, and 8.

Control then continues to block 440 where a determination is made whether the morphing was done in the clip view to timeline view direction and any icons were pushed out of view from the track 204. If the determination at block 440 is true, then control continues to block 445 where the position of the scrollbar 106 is updated to reflect the new position of the icons within the track 204. In another embodiment, the processing of blocks 440 and 445 is performed before the sequence of transposing begins. In another embodiment, the processing of blocks 440 and 445 is performed before each step in the transposing sequence. In yet another embodiment, the processing of blocks 440 and 445 is performed after each step in the transposing sequence. Control then continues to block 499 where the function returns.

If the determination at block 440 is false, then control continues directly to block 499.

If the determination at bock 415 is false, then control continues to block 425 where a determination is made whether the playhead icon 114 is in view. In another embodiment, the determination of block 425 may be performed prior to the determination of block 410. If the determination at block 425 is false then control continues to block 430 where a morphing operation is performed around the center point of the track (e.g., track 104 or 204 of FIG. 1 or 2) keeping the center point fixed if possible. The morphing operation morphs between the clip view and the timeline view (in either direction depending on which command was received at block 405), as previously described above with reference to the examples of FIGS. 1, 2, and 3. In an embodiment, the morphing may be performed by a dynamic animation system, as further described below with reference to FIGS. 5, 6, 7, and 8. Control then continues to block 440 as previously described above.

If the determination at block 425 is true, then control continues to block 435 where a morphing operation is performed around the playhead icon 114 (FIG. 1 or 2) keeping the playhead icon 114 within view. The morphing operation morphs between the clip view and the timeline view (in either direction depending on which command was received at block 405), as previously described above with reference to the examples of FIGS. 1, 2, and 3. When morphing from the timeline to the clip view, if the expansion of the clips would cause the sequence of clips to leave a void at the beginning of the track 104, then in an embodiment, all the clips are packed to the left edge of the track 104 to obviate this void. In an embodiment, the morphing may be performed by a dynamic animation system, as further described below with reference to FIGS. 5, 6, 7, and 8. Control then continues to block 440 as previously described above.

If the determination at block 410 is false, then control continues to block 425, as previously described above.

Figure 5:
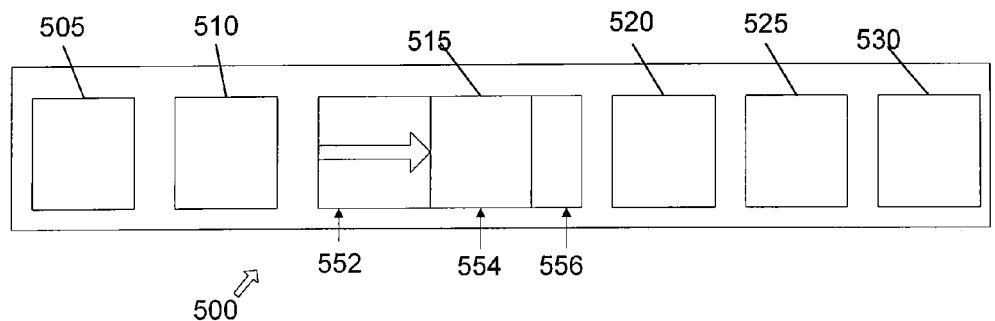
FIG. 5 depicts a pictorial representation of a track presented by a dynamic animation system, according to an embodiment of the invention.

FIG. 5 depicts a pictorial representation of a track 500 presented by a dynamic animation system. The timeline and the clip shelf are based on a dynamic animation system that handles the task of tracking and controlling the position of visual elements in a view. The implementation of the system is a view comprised of any number of tracks, each of which contains any number of visual elements, referred to as cells, such as cells 505, 510, 515, 520, 525, and 530. The track orders the cells into groups with a consistent distribution pattern. Tracks can be modified programmatically, but cells are controlled completely by their tracks. The responsibilities of the track include: positioning cells, adapting animation paths to fit the distribution pattern, and facilitating event handling.

The cell distribution pattern is programmed into the track 500. Whenever the data model or drawing context changes, the track executes a reflow operation, which determines the ideal position of each cell relative to the track's boundary. If the ideal position for a cell does not match its present target position, its animation path is redefined. The track then repeatedly computes the instantaneous position of each cell on its animation path and updates the modified regions of the view. Thus, for example, cell 515 has initial position 552, current position 554, and final position 556. Once all cells have reached their target positions, the animation cycle shuts down.

Figure 6:
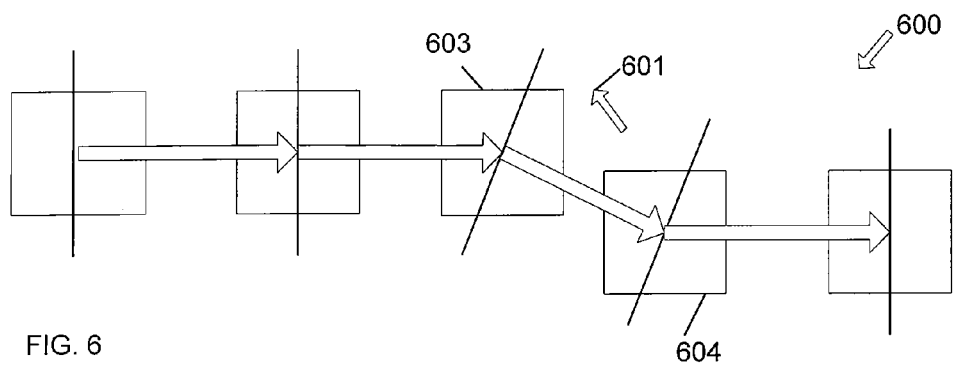
FIG. 6 depicts a pictorial representation of an insertion operation performed by a dynamic animation system, according to an embodiment of the invention.

FIG. 6 depicts a pictorial representation 600 of an insertion operation performed by a dynamic animation system, according to an embodiment of the invention. The basic track object is capable, without modification, of animated drag-and-drop insertion, with the requirement that the distribution pattern preserves order and contiguity. The built-in algorithm is capable of working with any formation, including non-linear orders such as spirals, waves, and rotated matrices.

In an embodiment, a user selects an insertion point 601 for an object. In various embodiments, the object may be a cell, an image, a style, an icon, or any other object. In an embodiment, the user may select the insertion point 601 via a mouse pointer, but in other embodiments any type of input device may be used to select the insertion point. Then, the algorithm finds the cell closest to the insertion point 601 on the coordinate plane transformed to favor the local direction of the distribution pattern. Next, the algorithm determines the average of the angles orthogonal to the segments joining the center of the nearest cell with both its precursor cell 603 and successor cell 604, calculates the line through the nearest cell using the aforementioned angle, and determines whether the point of insertion is greater than or less than the inequality based on that line. If the point of insertion is greater than the inequality based on that line, the image is inserted after the cell closest to the insertion point. If the point of inserter is less than the inequality based on that line, the image is inserted before the cell closest to the insertion point. The simplest case is a linear, contiguous distribution pattern, as used in the timeline and clip viewer.

The abstraction of individual cell behavior into more general tracks makes complicated transformations such as transitioning between the timeline and clip viewer relatively simple to implement.

Figure 7:
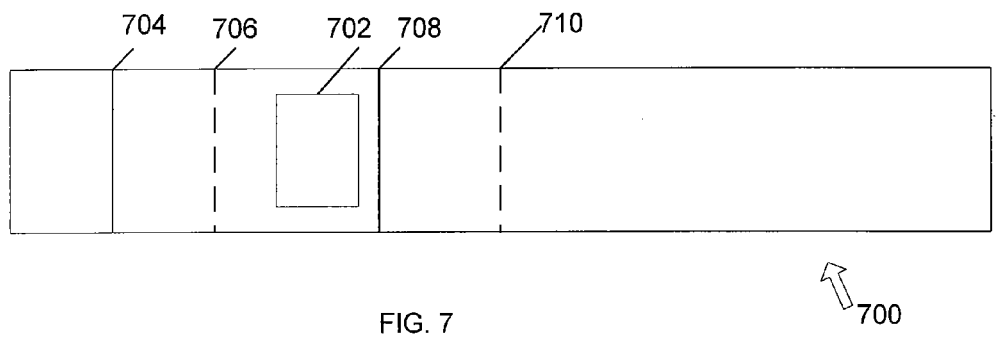
FIG. 7 depicts a pictorial representation of persistent thumbnail visibility, according to an embodiment of the invention.

FIG. 7 depicts a pictorial representation of persistent thumbnail visibility, according to an embodiment of the invention. As a means to recognize a clip 700 seen in the timeline, a thumbnail 702 is visible to identify the clip uniquely from other clips, and the thumbnail 702 is kept onscreen at all times to preserve this means of identification. When a clip extends past the visible region (bounded by left edge 704 and right edge 708) of the timeline, an embodiment of the invention provides an indication of how far past the visible region (bounded by left edge 704 and right edge 708) the clip extends, and conversely, what part of the clip 700 the user is viewing.

The positioning algorithm approaches the center of the clip 706 as it nears complete disclosure and keeps the clip onscreen at all times. The position of the clip is directly related to the relative position of the visible portion (bounded by left edge 704 and right edge 708) of the clip to the entire region of the clip 700. In the example of FIG. 7, the clip 700 extends past the right edge 708 of the visible portion, so the thumbnail 702 is moved off-center (from the center 706 of the visible region) toward the right. But, in another embodiment where the clip extends past the left edge 704 the thumbnail is moved off-center (from the center of the visible region) to the left. The further the clip extends relative to the visible region, the closer to the edge the thumbnail becomes. As the user scrolls rightward, the thumbnail moves leftward to indicate this relative movement. Likewise, as the user scrolls leftward, the thumbnail moves rightward to indicate this relative movement. Because the algorithms behave symmetrically between tracks, it is also easy to tell the global relative position of adjacent clips based on the local relative position of the thumbnails.

Figure 8:
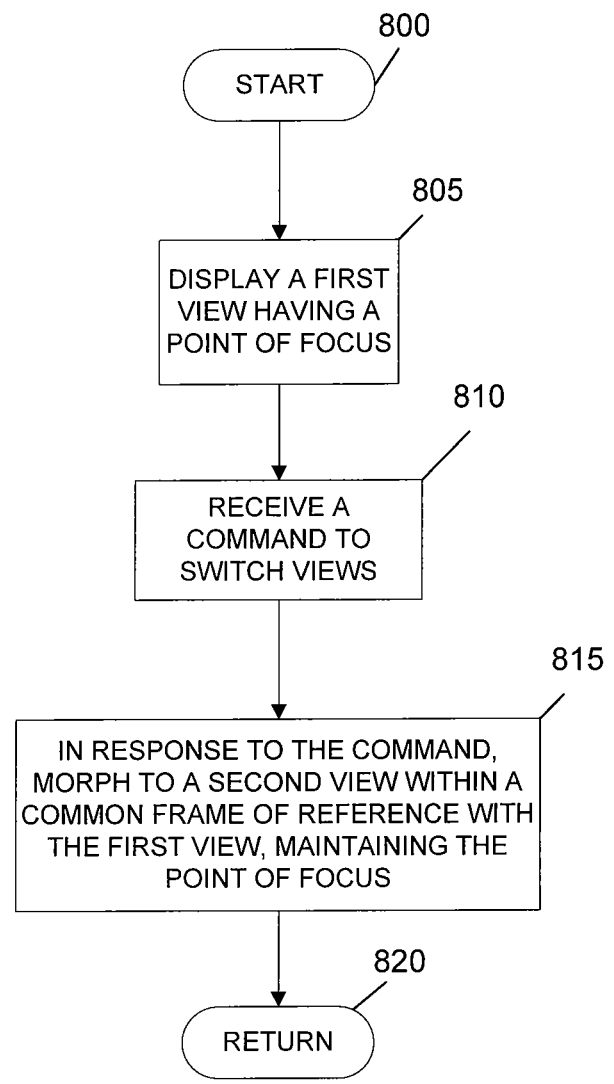
FIG. 8 depicts a flowchart of processing for displaying views, according to an embodiment of the invention.

FIG. 8 depicts a flowchart of processing for displaying views, according to an embodiment of the invention. Control begins at block 800. Control then continues to block 805 where a first view of data content is displayed and the displayed data content has a frame of reference and a point of focus (or area of interest). In an embodiment, the data may be a document, a map, an image, a video, or any other data content capable of being displayed. In an embodiment the frame of reference may be a linear axis along which the first view is displayed. In an embodiment the frame of reference may be a time sequence axis along which the first view is displayed. In another embodiment, the frame of reference may be a two-dimensional space.

Control then continues to block 810 where a command is received to switch from the first view to a second view. In an embodiment, the command may be a user selection of an area of interest (or point of focus) within the first view.

Control then continues to block 815 where, in response to the command, the first view is morphed into the second view of the data content. In an embodiment, the second view is in the same frame of reference as the first view. In an embodiment, the first and second views are arranged along linear axis that is the frame of reference.

In an embodiment, the point of focus of the first view is maintained in the second view. In an embodiment the user may define the point of focus such as via an input device. For example, when the input device is a pointing device, such as a mouse, the user may gesture with the pointing device to move a pointer on an output device to define the point of focus.

In an embodiment, the first and second views have different resolutions, with one view having a higher resolution and the other view having a lower resolution, and the morphing operation causes a zoom in or out between the resolutions. In an embodiment, a view with a higher resolution shows more detail than a view with a lower resolution. Control then continues to block 820 where the function returns.

Although only two views with one morphing operation between them are illustrated in FIG. 8, in other embodiments any number of morphing operations with any number of views may be performed. For example, a zoom operation may be performed from a first view having a first resolution to a second view having a second higher (or lower) than the first resolution to a third view having a third resolution lower (or higher) than the second resolution.

Figure 9:
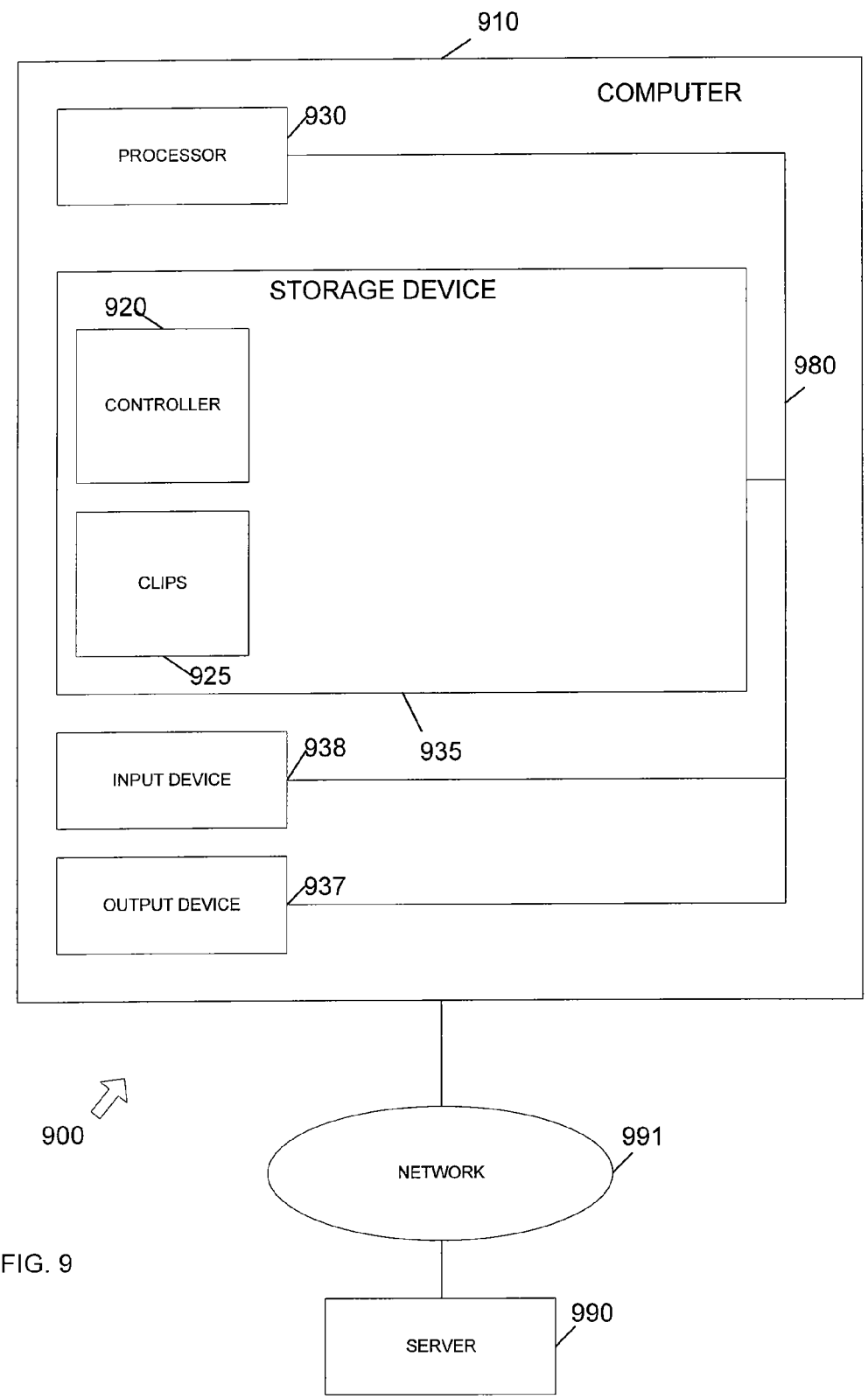
FIG. 9 depicts a block diagram of an example system for implementing an embodiment of the invention.

FIG. 9 depicts a block diagram of an example system for implementing an embodiment of the invention. A system 900 includes a computer 910 connected to a server 990 via a network 991. Although one computer 910, one server 990, and one network 991 are shown, in other embodiments any number or combination of them are present. In another embodiment, the server 990 and the network 991 are not present. For the avoidance of doubt, any interactive system with a graphical user interface could advantageously use the present invention. For example, a handheld computer, handheld our mounted graphical map device, television with interactivity, cell phone, or similar system could employ the invention.

The computer 910 includes a processor 930, a storage device 935, an output device 937, and an input device 938, all connected via a bus 980.

The processor 930 represents a central processing unit of any type of architecture, such as a CISC (Complex Instruction Set Computing), RISC (Reduced Instruction Set Computing), VLIW (Very Long Instruction Word), or a hybrid architecture, although any appropriate processing device may be used. The processor 930 executes instructions and includes that portion of the computer 910 that controls the operation of the entire computer. Although not depicted in FIG. 9, the processor 930 typically includes a control unit that organizes data and program storage in memory and transfers data and other information between the various parts of the computer 910. The processor 930 receives input data from the input device 938 and the network 991, reads and stores code and data in the storage device 935, and presents data to the output device 937.

Although the computer 910 is shown to contain only a single processor 930 and a single bus 980, the present invention applies equally to computers that may have multiple processors and to computers that may have multiple buses with some or all performing different functions in different ways.

The storage device 935 represents one or more mechanisms for storing data. For example, the storage device 935 may include read only memory (ROM), random access memory (RAM), magnetic disk storage media, optical storage media, flash memory devices, and/or other machine-readable media. In other embodiments, any appropriate type of storage device may be used. Although only one storage device 935 is shown, multiple storage devices and multiple types of storage devices may be present. Further, although the computer 910 is drawn to contain the storage device 935, it may be distributed across other computers, for example on server 990.

The storage device 935 includes a controller 920 and clips 925. The controller 920 includes instructions capable of being executed on the processor 930 to carry out the functions of the present invention, as previously described above with reference to FIGS. 1-8. In another embodiment, some or all of the functions of the present invention are carried out via hardware in lieu of a processor-based system. In an embodiment, the controller 920 is a video-editing application, but in other embodiments, the controller 920 may include any function capable of manipulating clips. Of course, the storage device 935 may also contain additional software and data (not shown), which is not necessary to understanding the invention.

The clips 925 include a digital representation of audio and/or visual media. In an embodiment, the clips 925 include digital representations of video frames. In another embodiment, the clips 925 include digital representations of video frames and associated audio tracks. In yet another embodiment, the clips 925 include digital representations of audio tracks. In various other embodiments, the clips 925 may include a document, a map, or any other data capable of being displayed or otherwise presented to a user.

Although the controller 920 and the clips 925 are shown to be within the storage device 935 in the computer 910, some or all of them may be distributed across other systems, for example on the server 990 and accessed via the network 991.

The output device 937 is that part of the computer 910 that displays output to the user. The output device 937 may be a cathode-ray tube (CRT) based video display well known in the art of computer hardware. But, in other embodiments the output device 937 may be replaced with a liquid crystal display (LCD) based or gas, plasma-based, flat-panel display. In still other embodiments, any appropriate display device may be used. Although only one output device 937 is shown, in other embodiments, any number of output devices of different types or of the same type may be present. The output device 937 displays the windows 100 and 200 previously described above with reference to FIGS. 1 and 2, respectively, or the images 500, 600, and 700 previously described above with reference to FIGS. 5, 6, and 7, respectively.

The input device 938 may be a keyboard, mouse or other pointing device, trackball, touchpad, touchscreen, keypad, microphone, voice recognition device, or any other appropriate mechanism for the user to input data to the computer 910 and manipulate the user interfaces previously described above with respect to FIGS. 1 and 2. Although only one input device 938 is shown, in another embodiment any number and type of input devices may be present.

The bus 980 may represent one or more busses, e.g., PCI, ISA (Industry Standard Architecture), X-Bus, EISA (Extended Industry Standard Architecture), or any other appropriate bus and/or bridge (also called a bus controller).

The computer 910 is an electronic device that may be implemented using any suitable hardware and/or software, such as a personal computer. Portable computers, laptop or notebook computers, PDAs (Personal Digital Assistants), televisions, pocket computers, handheld or mounted graphical map devices, video editing systems, appliances, telephones, and mainframe computers are examples of other electronic devices that are possible configurations of the computer 910. The hardware and software depicted in FIG. 9 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 991 may be any suitable network and may support any appropriate protocol suitable for communication to the computer 910.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method for inserting an object comprising:
    receiving a user input selecting an insertion point for the object;
    finding a nearest cell of a track using one or more processors to determine a location of the nearest cell that is most near to the insertion point on a coordinate plane transformed to favor a local direction of a distribution pattern;
    calculating a line through the nearest cell using the one or more processors to determine an average of a plurality of angles orthogonal to segments joining a center of the nearest cell with both a precursor cell and a successor cell to the nearest cell; and
    inserting the object based on the line.

2. The method of claim 1, wherein the inserting the object based on the line further comprises:
    determining whether the insertion point is greater than or less than an inequality based on the line.

3. The method of claim 1, wherein the inserting the object based on the line further comprises:
    if the insertion point is greater than an inequality based on the line, inserting the object after the nearest cell.

4. The method of claim 1, wherein the inserting the object based on the line further comprises:
    if the insertion point is less than an inequality based on the line, inserting the object before the nearest cell.

5. The method of claim 1, wherein the distribution pattern includes a linear, contiguous distribution pattern.

6. The method of claim 1, wherein inserting the object includes inserting a cell, an image, a style, or an icon.

7. The method of claim 1, wherein inserting the object includes preserving order and contiguity of the distribution pattern.

8. An apparatus for inserting an object comprising:
    means for receiving a user input selecting an insertion point for the object;
    means for finding a nearest cell of a track using an one or more processors to determine a location of the nearest cell that is most near to the insertion point on a coordinate plane transformed to favor a local direction of a distribution pattern;
    means for calculating a line through the nearest cell using the one or more processors to determine an average of a plurality of angles orthogonal to segments joining a center of the nearest cell with both a precursor cell a successor cell to the nearest cell; and
    means for determining whether the insertion point is greater than or less than an inequality based on the line.

9. The apparatus of claim 8, further comprising:
    means for inserting the object after the nearest cell if the insertion point is greater than an inequality based on the line.

10. The apparatus of claim 8, further comprising:
    means for inserting the object before the nearest cell if the insertion point is less than an inequality based on the line.

11. The apparatus of claim 8, wherein the apparatus includes a pointer device operable to select the insertion point.

12. A machine-readable storage medium having stored instructions, which when performed by a machine, cause the machine to perform operations comprising:
    receiving a user input selecting an insertion point for the object;
    finding a nearest cell of a track using an one or more processors to determine a location of the nearest cell that is most near to the insertion point on a coordinate plane transformed to favor a local direction of a distribution pattern;

calculating a line through the nearest cell using the one or more processors to determine an average of a plurality of angles orthogonal to segments joining a center of the nearest cell with both a precursor cell and a successor cell to the nearest cell; and inserting the object based on the line.

13. The machine-readable storage medium of claim 12, wherein the inserting the object based on the line further comprises:

determining whether the insertion point is greater than or less than an inequality based on the line.

14. The machine-readable storage medium of claim 12, wherein the inserting the object based on the line further comprises:

if the insertion point is greater than an inequality based on the line, inserting the object after the nearest cell.

15. The machine-readable storage medium of claim 12, wherein the inserting the object based on the line further comprises:

if the insertion point is less than an inequality based on the line, inserting the object before the nearest cell.

16. The machine-readable storage medium of claim 12, wherein the distribution pattern includes a linear, contiguous distribution pattern.

17. The machine-readable storage medium of claim 12, wherein inserting the object includes inserting a cell, an image, a style, or an icon.

18. The machine-readable storage medium of claim 12, wherein inserting the object includes preserving order and contiguity of the distribution pattern.

19. A system comprising:
one or more processors;
   a storage device operatively coupled to the one or more processors, the storage device including instructions stored thereon, the instructions executable by the one or more processors such the one or more processors and the storage device are operable to:
      find a nearest cell of a track, wherein the nearest cell is most near to an insertion point on a coordinate plane transformed to favor a local direction of a distribution pattern;
      determine an average of a plurality of angles orthogonal to segments joining a center of the nearest cell with both a precursor cell and a successor cell to the nearest cell;
   calculate a line through the nearest cell based on the average; and
   determine whether the insertion point is greater than or less than an inequality based on the line; and
      insert an object based on determination of whether the insertion point is greater than or less than the inequality; and
an output device that displays insertion of the object.

20. The system of claim 19, wherein the one or more processors and the storage device are operable to insert the object after the nearest cell if the insertion point is greater than the inequality or to insert the object before the nearest cell if the insertion point is less than the inequality.

21. The system of claim 19, wherein the one or more processors, the storage device, or both the one or more processors and the storage device are distributed across a network.

* * * * *

UNITED STATES PATENT AND TRADEMARK OFFICE
CERTIFICATE OF CORRECTION

PATENT NO. : 8,832,554 B2  Page 1 of 1
APPLICATION NO. : 12/862475
DATED : September 9, 2014
INVENTOR(S) : Austin W. Shoemaker It is certified that error appears in the above-identified patent and that said Letters Patent is hereby corrected as shown below:

On the Title page, in item (57), in "Abstract", in column 2, line 8, delete "an" and insert --a--, therefor In the Claims In column 12, line 6, in Claim 19, after "such", insert --that--, therefor Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,832,554 B2  
APPLICATION NO. : 12/862475  
DATED : September 9, 2014  
INVENTOR(S) : Austin W. Shoemaker Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this  
Thirteenth Day of October, 2015

Michelle K. Lee  
*Director of the United States Patent and Trademark Office*